US010922922B2

(12) United States Patent
Tam

(10) Patent No.: US 10,922,922 B2
(45) Date of Patent: *Feb. 16, 2021

(54) GAMING SYSTEM WITH FEATURE VARIATION BASED ON PLAYER INPUT

(71) Applicant: ARISTOCRAT TECHNOLOGIES AUSTRALIA PTY LIMITED, North Ryde (AU)

(72) Inventor: Billy Tam, Lindfield (AU)

(73) Assignee: Aristocrat Technologies Australia Pty Limited, North Ryde (AU)

( * ) Notice: Subject to any disclaimer, the term of this patent is extended or adjusted under 35 U.S.C. 154(b) by 22 days.

This patent is subject to a terminal disclaimer.

(21) Appl. No.: 16/265,576

(22) Filed: Feb. 1, 2019

(65) Prior Publication Data

US 2019/0164385 A1 May 30, 2019

Related U.S. Application Data

(63) Continuation of application No. 15/178,273, filed on Jun. 9, 2016, now Pat. No. 10,223,870.

(30) Foreign Application Priority Data

Jun. 9, 2015 (AU) ................................ 2015902142

(51) Int. Cl.

| | |
|---|---|
| ***A63F 13/00*** | (2014.01) |
| ***G07F 17/32*** | (2006.01) |
| ***G07F 17/34*** | (2006.01) |

(52) U.S. Cl.

CPC ...... *G07F 17/3262* (2013.01); *G07F 17/3213* (2013.01); *G07F 17/3244* (2013.01); *G07F 17/3258* (2013.01); *G07F 17/3267* (2013.01); *G07F 17/34* (2013.01)

(58) Field of Classification Search

CPC .. G07F 17/34; G07F 17/3267; G07F 17/3244; G07F 17/3213; G07F 17/3262; G07F 17/3258; G07F 17/326

See application file for complete search history.

(56) References Cited

U.S. PATENT DOCUMENTS

| | | | |
|---|---|---|---|
| 8,100,761 | B2 | 1/2012 | Bennett |
| 8,287,367 | B2 | 10/2012 | Hall et al. |
| 8,292,730 | B2 | 10/2012 | Bennett |
| 8,602,878 | B2 | 12/2013 | Bennett |
| 8,662,999 | B2 | 3/2014 | Bennett |
| 8,740,685 | B2 | 6/2014 | Stevens et al. |

(Continued)

*Primary Examiner* — Justin L Myhr

(74) *Attorney, Agent, or Firm* — Armstrong Teasdale LLP

(57) ABSTRACT

A game controller for a gaming system configured to receive an input to initiate a play of a game, in response to a trigger event, display a plurality of selectable games from one of a first table of feature games and a second table of feature games, the displayed plurality of selectable games is the first table of feature games when the input is a first input, the displayed plurality of selectable games is the second table of feature games when the input is the second input, each of the first table and second table includes a plurality of games, each game of the plurality of games includes a corresponding set of prize modifiers, receive a selection indicative of a selected game selected from the displayed plurality of selectable games, and conduct play of the selected game using the corresponding set of prize modifiers.

20 Claims, 7 Drawing Sheets

(56) References Cited

U.S. PATENT DOCUMENTS

| | | | | |
|---|---|---|---|---|
| 9,076,309 | B2 | 7/2015 | Bennett | |
| 9,697,694 | B2 * | 7/2017 | Beria | G07F 17/3262 |
| 2003/0078093 | A1 | 4/2003 | Simms et al. | |
| 2003/0176215 | A1 | 9/2003 | Palmer et al. | |
| 2006/0281528 | A1 | 12/2006 | Hall et al. | |
| 2009/0298578 | A1 * | 12/2009 | Yoshizawa | G07F 17/3262<br>463/25 |
| 2010/0124969 | A1 | 5/2010 | Hughes et al. | |
| 2011/0118002 | A1 | 5/2011 | Aoki | |
| 2011/0183743 | A1 | 7/2011 | Stevens et al. | |
| 2013/0090156 | A1 | 4/2013 | Oh et al. | |
| 2013/0157756 | A1 | 6/2013 | Hall et al. | |
| 2014/0141857 | A1 | 5/2014 | Meyer | |
| 2014/0274348 | A1 | 9/2014 | Baerlocher | |
| 2016/0042593 | A1 | 2/2016 | Tam | |

* cited by examiner

GAMING SYSTEM WITH FEATURE VARIATION BASED ON PLAYER INPUT

CROSS-REFERENCE TO RELATED APPLICATIONS

This application claims the benefit of priority to Australian Patent Application No. 2015902142, filed Jun. 9, 2015, and is a continuation of U.S. patent application Ser. No. 15/178,273 filed Jun. 9, 2016, the entire contents and disclosures of which are hereby incorporated herein by reference in their entireties.

FIELD OF THE INVENTION

The present invention relates to a gaming system, a method of gaming, a game controller and computer program code.

BACKGROUND TO THE INVENTION

It is known to provide a gaming system which comprises a game controller arranged to randomly display several symbols from a predetermined set of symbols and to determine a game outcome such as a game win based on the displayed symbols. Such gaming systems may commonly be implemented as a stepper machine provided with reels with each reel carrying several symbols of the set, or a video machine wherein selected symbols are displayed on virtual reels on a video display.

While such gaming systems provide users with enjoyment, a need exists for alternative gaming systems in order to maintain or increase player enjoyment.

SUMMARY OF THE INVENTION

In one aspect, a game controller for a gaming system is provided. The game controller is configured to execute instructions stored in a memory. When executed by the game controller, the instructions cause the game controller to receive an input to initiate a play of a game. The instructions also cause the game controller to, in response to a trigger event, display a plurality of selectable games from one of a first table of feature games and a second table of feature games. The displayed plurality of selectable games is the first table of feature games when the input is a first input. The displayed plurality of selectable games is the second table of feature games when the input is the second input. Each of the first table and second table includes a plurality of games. Each game of the plurality of games includes a corresponding set of prize modifiers. The instructions further cause the processor to receive a selection indicative of a selected game selected from the displayed plurality of selectable games. The instructions also cause the processor to conduct play of the selected game using the corresponding set of prize modifiers.

In another aspect, a gaming system is provided. The gaming system includes a player interface comprising a display for displaying game outcomes to a player. The gaming system also includes a game controller configured to execute instructions stored in a memory. When executed by the game controller, the instructions cause the game controller to receive an input to initiate a play of a game. The instructions also cause the game controller to, in response to a trigger event, display a plurality of selectable games from one of a first table of feature games and a second table of feature games. The displayed plurality of selectable games is the first table of feature games when the input is a first input. The displayed plurality of selectable games is the second table of feature games when the input is a second input. Each of the first table and second table includes a plurality of games. Each game of the plurality of games includes a corresponding set of prize modifiers. The instructions further cause the game controller to receive a selection indicative of a selected game selected from the displayed plurality of selectable games. The instructions also cause the game controller to conduct play of the selected game using the corresponding set of prize modifiers.

In yet another aspect, a method of electronic gaming implemented on an electronic gaming machine is provided. The electronic gaming machine includes at least one processor in communication with at least one memory device, a player input device, and a display device. The method includes receiving an input to initiate a play of a game. The method also includes, in response to a trigger event, displaying a plurality of selectable games from one of a first table of feature games and a second table of feature games. The displayed plurality of selectable games is the first table of feature games when the input is a first input. The displayed plurality of selectable games is the second table of feature games when the input is a second input. Each of the first table and second table includes a plurality of games. Each game of the plurality of games includes a corresponding set of prize modifiers. The method further includes receiving a selection indicative of a selected game selected from the displayed plurality of selectable games. The method also includes conducting play of the selected game on the gaming system using the corresponding set of prize modifiers.

The invention also provides computer program code that when executed by a processor implements the method described above. The invention also provides a computer readable medium comprising that program code.

In addition, the invention provides a data packet or packets comprising computer program code that when executed by a processor implements the method described above.

It should be noted that any of the various individual features of each of the above aspects of the invention, and any of the various individual features of the embodiments described herein, including in the claims, can be combined as suitable and desired.

BRIEF DESCRIPTION OF THE DRAWINGS

In order that the invention may be more clearly ascertained, embodiments will now be described, by way of example, with reference to the accompanying drawing, in which.

DETAILED DESCRIPTION OF EMBODIMENTS OF THE INVENTION

According to embodiments of the invention there is provided a gaming system in which a player plays a spinning reel type game or games. An award is determined for the game or games. The reels spin about an axis in a conventional manner to display a sequence of symbols and in due course may form a winning pattern (such as a win line). According to embodiments of the present invention, the reels are each of apparent three-dimensional, torus form. In one example, the torus has a circular cross section, and in another example a square cross section. It will be appreciated, however, that essentially any cross section can be used provided it is suitable for displaying the symbols.

The gaming system may be provided in a number of different forms.

In a first form, a stand-alone gaming machine is provided in which all or most components required for implementing the game are present in a player operable gaming machine.

In a second form, a distributed architecture is provided wherein some of the components required for implementing the game are present in a player operable gaming machine and some of the components required for implementing the game are located remotely relative to the gaming machine. For example, a "thick client" architecture may be used wherein part of the game is executed on a player operable gaming machine and part of the game is executed remotely, such as by a gaming server; or a "thin client" architecture may be used wherein most of the game is executed remotely such as by a gaming server and a player operable gaming machine is used only to display audible and/or visible gaming information to the player and receive gaming inputs from the player.

However, it will be understood that other arrangements are envisaged. For example, an architecture may be provided wherein a gaming machine is networked to a gaming server and the respective functions of the gaming machine and the gaming server are selectively modifiable. For example, the gaming system may operate in stand alone gaming machine mode, "thick client" mode or "thin client" mode depending on the game being played, operating conditions, and so on. Other variations will be apparent to persons skilled in the art.

Figure 1:
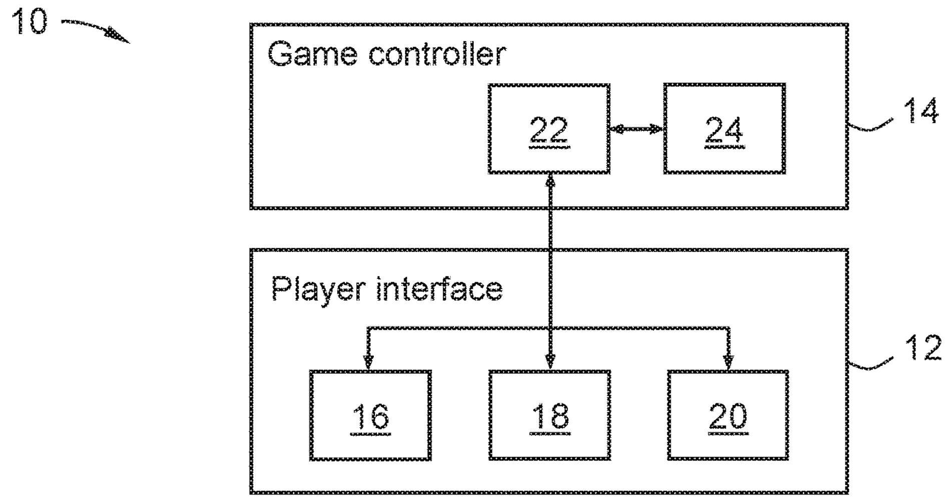
FIG. 1 is a block diagram of the core components of a gaming system according to an embodiment of the invention.

Irrespective of the form, the gaming system comprises several core components. Referring to FIG. 1, at the broadest level the core components are a player interface 12 and a game controller 14, as illustrated schematically at 10 in FIG. 1.

Player interface 12 is arranged to enable manual interaction between a player and the gaming system and for this purpose includes the input/output components required for the player to enter instructions and play the game. Components of the player interface may vary from embodiment to embodiment but will typically include a credit mechanism 16 to enable a player to input credits and receive payouts, one or more displays 18 and a game play mechanism 20 that enables a player to input game play instructions.

Game controller 14 is in data communication with the player interface and typically includes a processor 22 that processes the game play instructions in accordance with game play rules and outputs game play outcomes to the display. Typically, the game play instructions are stored as program code in a memory 24 but can also be hardwired. Herein the term "processor" is used to refer generically to any device that can process game play instructions in accordance with game play rules and may include: a microprocessor, microcontroller, programmable logic device or other computational device, a general purpose computer (e.g. a PC) or a server.

Figure 2:
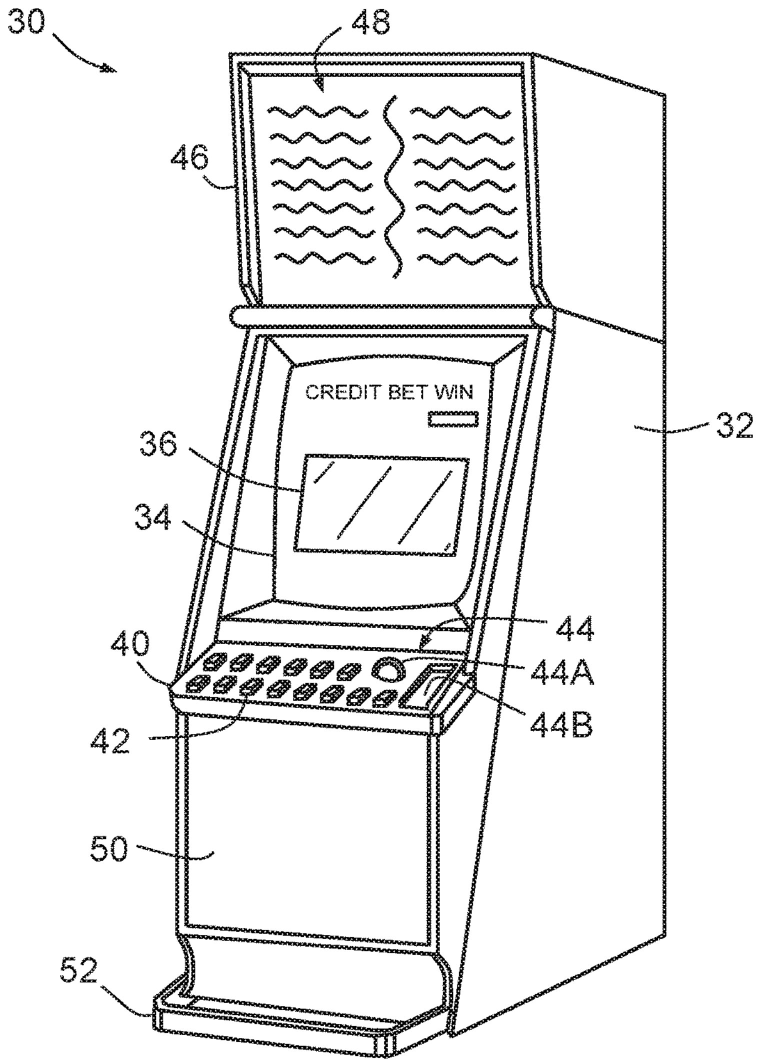
FIG. 2 is a perspective view of a gaming machine according to an embodiment of the invention.

A gaming system in the form of a stand alone gaming machine 30 according to another embodiment of the invention is shown schematically at 30 in FIG. 2. Gaming machine 30 includes a console 32 having a display 34 on which is displayed representations of a game 36 that can be played by a player. A mid-trim 40 of the gaming machine 30 houses a bank of buttons 42 for enabling a player to interact with the gaming machine, in particular during game play. The mid-trim 40 also houses a credit input mechanism 44 that, in this example, includes a coin input chute 44A and a bill collector 44B. Other credit input mechanisms may also be employed, such as a card reader for reading a smart card, debit card or credit card. A player marketing module having a reading device may also be provided for the purpose of reading a player tracking device, for example as part of a loyalty program. The player tracking device may be in the form of a card, flash drive or any other portable storage medium capable of being read by the reading device.

A top box 46 may carry artwork 48 including, for example, pay tables and details of bonus awards and other information or images relating to the game. Further artwork and/or information may be provided on a front panel 50 of the console 32. A coin tray 52 is mounted beneath the front panel 50 for dispensing cash payouts from the gaming machine 30.

Display 34 of gaming machine 30 is in the form of a video display unit, particularly a cathode ray tube screen device. Alternatively, the display 34 may be a liquid crystal display, plasma screen, any other suitable video display unit, or the visible portion of an electromechanical device. The top box 46 may also include a display, such as a video display unit, which may be of the same type as the display 34, or of a different type.

Figure 3:
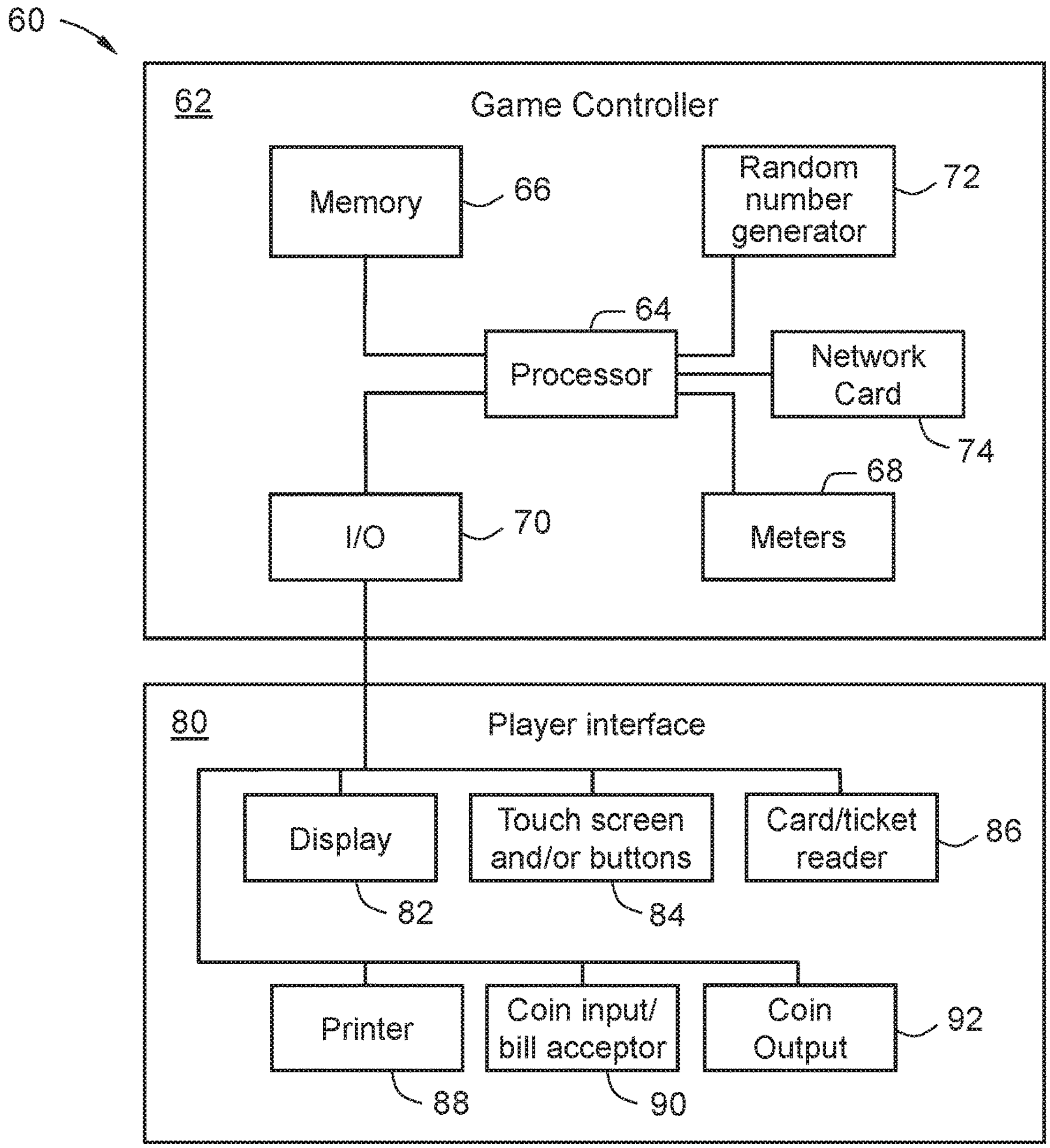
FIG. 3 is a block diagram of the functional components of a gaming machine according to an embodiment of the invention.

FIG. 3 is a schematic block diagram of a typical gaming machine 60 according to the present invention, in which only the operative components are shown for clarity. Gaming machine 60 may be the same as or different from gaming machine 30 of FIG. 2. Gaming machine 60 includes a game controller 62 having a processor 64. Instructions and data to control operation of processor 64 are stored in a memory 66, which is in data communication with processor 64. Typically, gaming machine 60 includes both volatile and non-volatile memory and more than one of each type of memory, with such memories being collectively represented by memory 66.

Gaming machine 60 has hardware meters 68 for purposes including ensuring regulatory compliance and monitoring player credit, and an input/output (I/O) interface 70 for communicating with peripheral devices of gaming machine 60. Input/output interface 70, the peripheral devices or both may be intelligent devices with their own memory for storing associated instructions and data for use with the input/output interface 70 or the peripheral devices.

Gaming machine 60 also includes a random number generator 72 generates random numbers for use by the processor 64. Persons skilled in the art will appreciate that the reference to random numbers includes pseudo-random numbers.

In addition, gaming machine 60 may include a communications interface, for example a network card 74. Network card 74 may, for example, send status information, accounting information or other information to a central controller, server or database and receive data or commands from the central controller, server or database.

In the example shown in FIG. 3, gaming machine 60 includes a player interface 80 that includes peripheral devices that communicate with game controller 62. These peripheral devices comprise one or more displays 82, a touch screen and/or buttons 84, a card and/or ticket reader 86, a printer 88, a bill acceptor and/or coin input mechanism 90 and a coin output mechanism 92. Additional hardware may be included as part of the gaming machine 60, or hardware may be omitted as required for the specific implementation.

Figure 4:
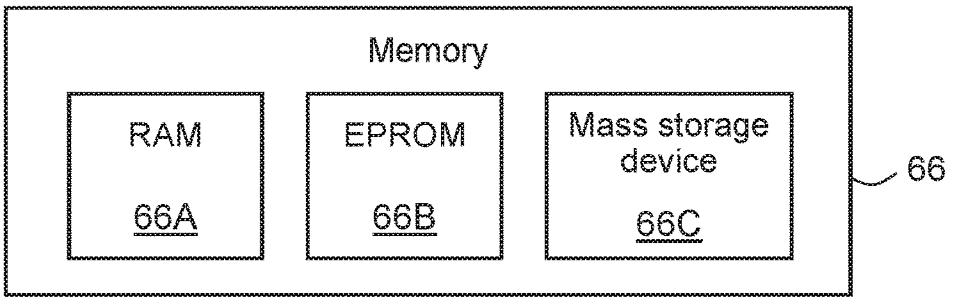
FIG. 4 is a block diagram representing the structure of a memory according to an embodiment of the invention.

FIG. 4 shows a block diagram of the main components of an exemplary memory 66. Memory 66 includes RAM 66A, EPROM 66B and a mass storage device 66C. RAM 66A typically temporarily holds program files for execution by the processor 64 and related data. EPROM 66B may be a boot ROM device and/or may contain some system or game related code. Mass storage device 66C is typically used to store game programs, the integrity of which may be verified and/or authenticated by processor 64 using protected code from EPROM 66B or elsewhere.

It is also possible for the operative components of the gaming machine 60 to be distributed; for example, input/output devices 82, 84, 86, 88, 90, 92 may be provided remotely from game controller 62.

Figure 5:
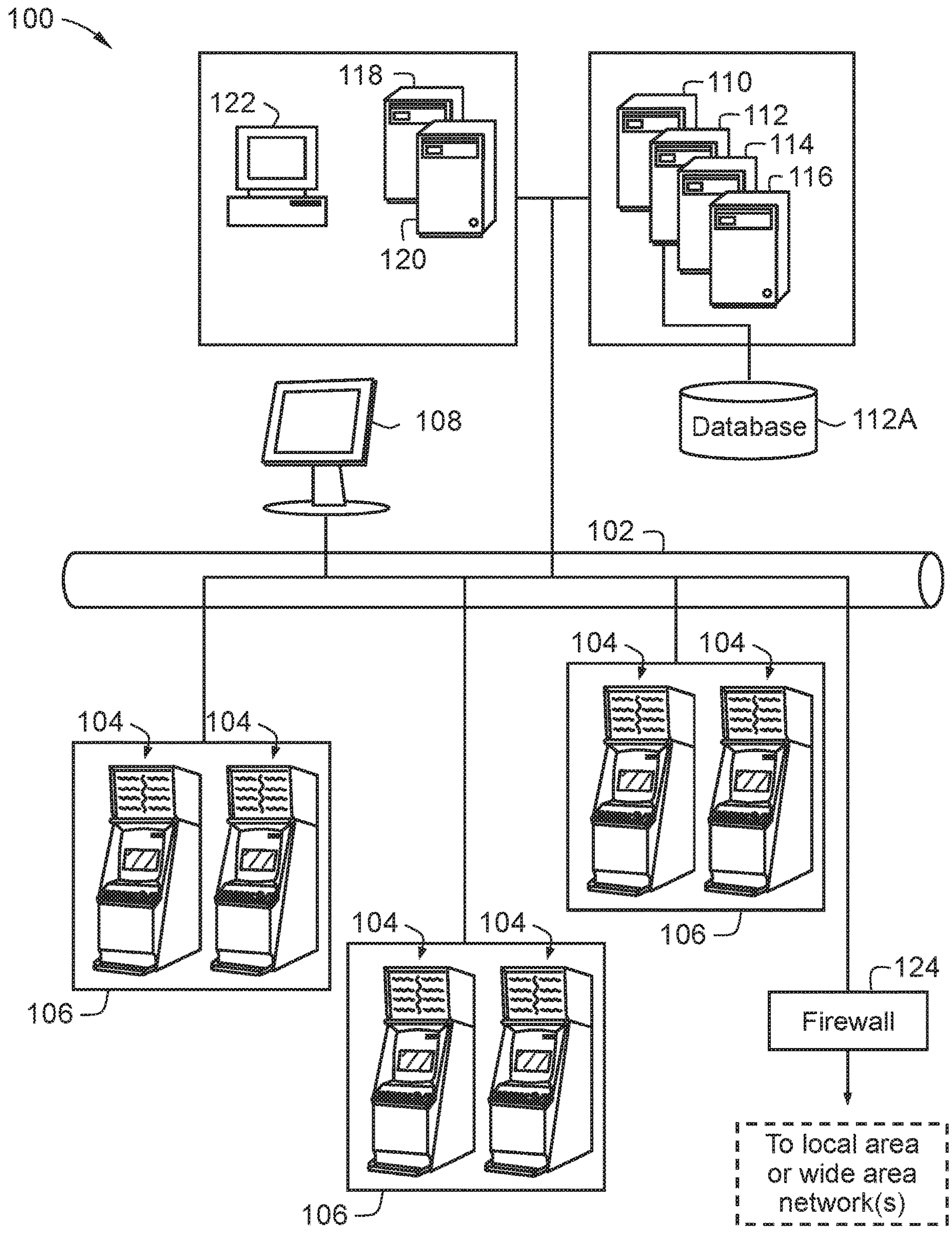
FIG. 5 is a diagram schematic of a networked gaming system according to an embodiment of the invention.

FIG. 5 shows a gaming system 100 in accordance with an alternative embodiment. Gaming system 100 includes a network 102 that may be, for example, an Ethernet network. Gaming machines 104, shown arranged in three banks 106 of two gaming machines 104 in FIG. 5, are connected to the network 102. Gaming machines 104 provide a player operable interface and may be the same as gaming machines 30, 60 shown in FIGS. 2 and 3, or may have simplified functionality depending on the requirements for implementing game play. While banks 106 of two gaming machines are illustrated in FIG. 5, banks of one, three or more gaming machines are also envisaged.

One or more displays 108 may also be connected to the network 102. Displays 108 may, for example, be associated with one or more banks 106 of gaming machines. Displays 108 may be used to display representations associated with game play on gaming machines 104, to display other representations, such as promotional or informational material, or both.

In a thick client embodiment, game server 110 of gaming system 100 implements part of the game played by a player using a gaming machine 104 and gaming machine 104 implements part of the game. With this embodiment, as both the game server and the gaming machine implement part of the game, they collectively provide a game controller. A database management server 112 may manage storage of game programs and associated data for downloading or access by the gaming devices 104 in a database 112A. Typically, if the gaming system enables players to participate in a Jackpot game, a Jackpot server 114 will be provided to carry out the accounting in respect of the Jackpot game. A loyalty program server 116 may also be provided.

In a thin client embodiment, game server 110 implements most or all of the game played by a player using a gaming machine 104 and gaming machine 104 essentially provides only the player interface. With this embodiment, game server 110 provides the game controller. Gaming machine 104 receives player instructions, passes these to game server 110, which then processes them and returns game play outcomes to gaming machine 104 for display. In a thin client embodiment, gaming machines 104 may be computer terminals, such as PCs running software that provides a player interface operable using standard computer input and output components.

Servers are also typically provided to assist in the administration of gaming system 100 including, for example, a gaming floor management server 118, and a licensing server 120 to monitor the use of licenses relating to particular games. An administrator terminal 122 is provided to allow an administrator to run network 102 and the devices connected to the network.

Gaming system 100 may communicate with other gaming systems, with other local networks such as a corporate network, with a wide area network such as the Internet, for example through a firewall 124, or a combination of these.

Persons skilled in the art will appreciate that, in accordance with known techniques, functionality at the server side of gaming system 100 may be distributed over a plurality of different computers. For example, elements may be run as a single "engine" on one server or a separate server may be provided. For example, game server 110 could run a random generator engine. Alternatively, a separate random number generator server could be provided. Further, persons skilled in the art will appreciate that a plurality of games servers could be provided to run different games or a single game server may run a plurality of different games as required by the terminals.

Figure 6:
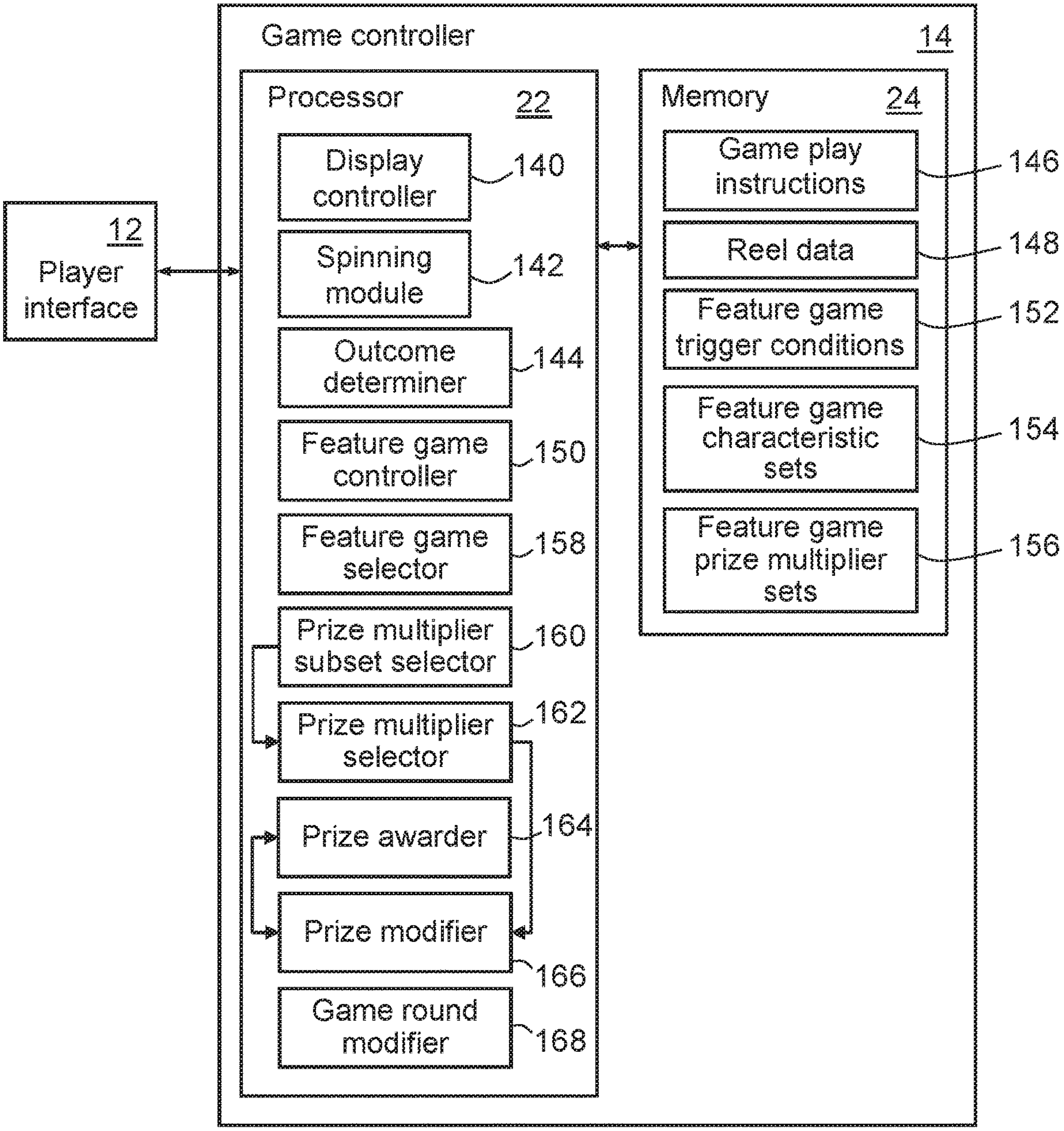
FIG. 6 is a view of the game controller and player interface of the gaming system of FIG. 1, according to an embodiment of the invention.

FIG. 6 is a schematic view of the player interface 12 and a game controller 14 of FIG. 1, with greater detail shown in the game controller 14. Specifically, processor 12 of game controller 14 includes a display controller 140, a spinning module 142 and an outcome determiner 144. The display controller 140 controls the view that is displayed on display 34, 82; spinning module 142 controls the manner in which reels are displayed when displayed to spin. Outcome determiner 144, which typically receives input from random number generator 72, determines game outcomes. Display controller 140, spinning module 142 and outcome determiner 144 cooperate to display and determine the outcome of a game.

Memory 24 includes game play instructions 146, which control the reels to be displayed to spin such that game symbols arranged along the reels are displayed as moving downwards in display 34, 82, and reel data 148 comprising vertical symbol sequence data. The vertical symbol sequence data is indicative of the sequence in which game symbols are to be displayed along each of the reels. This can be encoded in any convenient way.

Processor 22 further includes a feature game controller 150, which determines when a player becomes eligible to be awarded a feature game, according to trigger conditions 152 stored in memory 24. Trigger conditions 152 specify that a feature game is triggered by a scatter symbol win during a base game and randomly after any bought base game.

Feature game controller 150 is configured, once a feature game has been awarded, to control display controller 140 to display to the player a plurality of feature games for player selection. Each of the feature games has a corresponding feature game characteristic set 154 and a feature game prize multiplier set 156, stored in memory 24. For any particular feature game, the corresponding feature game characteristic set 154 and feature game prize multiplier set 156 specify, respectively, the number of game rounds (colloquially referred to, when in a feature game, as 'free games') included in that feature game and the possible multipliers by which any prize awarded in the feature game will be multiplied under certain conditions (described below).

When the feature games are displayed to the player, feature game controller 150 also controls display controller 140 to display, in association with each feature game, the corresponding number of game rounds and possible multipliers. This allows the player to consider which of the offered feature games to select. It should be understood that the feature games may have the same game play rules, but differ only in respect of the number of game rounds and possible multipliers (though in other embodiments the game play rules may also differ). Thus, in the present embodiment the feature games indeed have the same game play rules, and differ only in respect of the number of game rounds and possible multipliers as shown in Table 1:

TABLE 1

Feature Games without Ante Bet

| Feature Game No. | Game Rounds | Trigger Condition | Multiplier set |
|---|---|---|---|
| 1 | 25 | one or more | 2, 3, 5 |
| 2 | 20 | DRAGON symbols | 3, 5, 8 |
| 3 | 10 | substitutes in a win | 5, 8, 10 |
| 4 | 8 | | 8, 10, 15 |
| 5 | 5 | | 10, 15, 40 |

It will be seen that, according to this embodiment, in making a selection from the available feature games, the user may choose to receive more game rounds but at the expense of the size of the possible prize multiplier, or vice versa.

Also according to this embodiment, if the player has made an ante bet when awarded a feature game, feature game controller 150 controls display controller 140 to display a different group of feature games, as shown in Table 2. It should again be noted, however, that in this embodiment the game play rules are the same for each of the feature games in Table 2, and indeed the same as those of the feature games in Table 1. In other embodiments they may differ in each respect.

TABLE 2

Feature Games with Ante Bet

| Feature Game No. | Game Rounds | Trigger Condition | Multiplier set |
|---|---|---|---|
| 1 | 25 | one or more | 2, 3, 5 |
| 2 | 20 | DRAGON symbols | 3, 5, 8 |
| 3 | 15 | substitutes in a win | 5, 8, 10 |
| 4 | 13 | | 8, 10, 15 |
| 5 | 10 | | 10, 15, 40 |
| 6 (or "Mystery Choice") | randomly selected from 25, 20, 15, 13 and 10 | | randomly selected from {2, 3, 5}, {3, 5, 8}, {5, 8, 10}, {8, 10, 15} and {10, 15, 40} |

Figure 7:
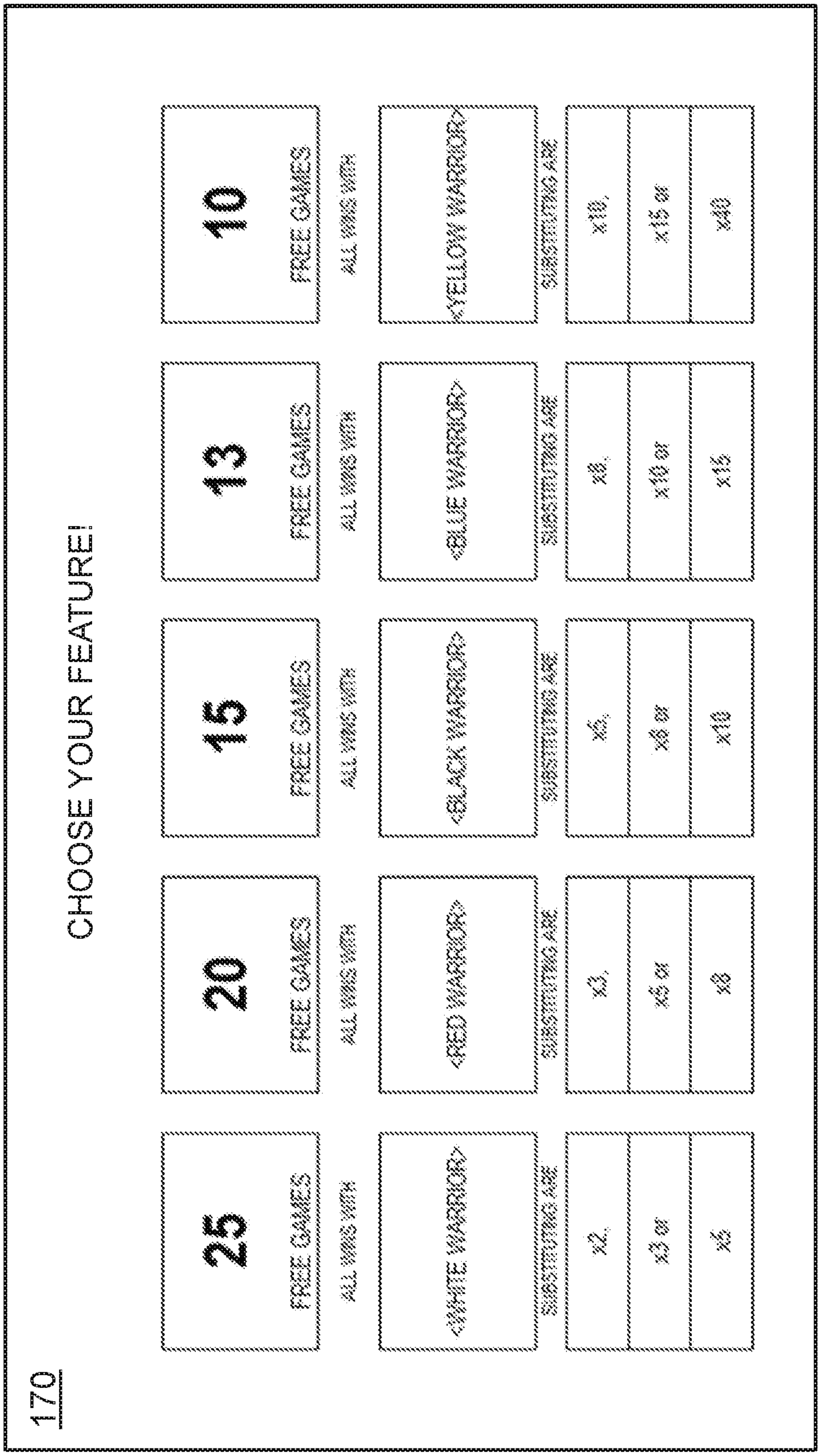
FIG. 7 is a schematic view of the display of the gaming machine of FIG. 1 displaying feature games available when an ante bet has not been made.
Figure 8:
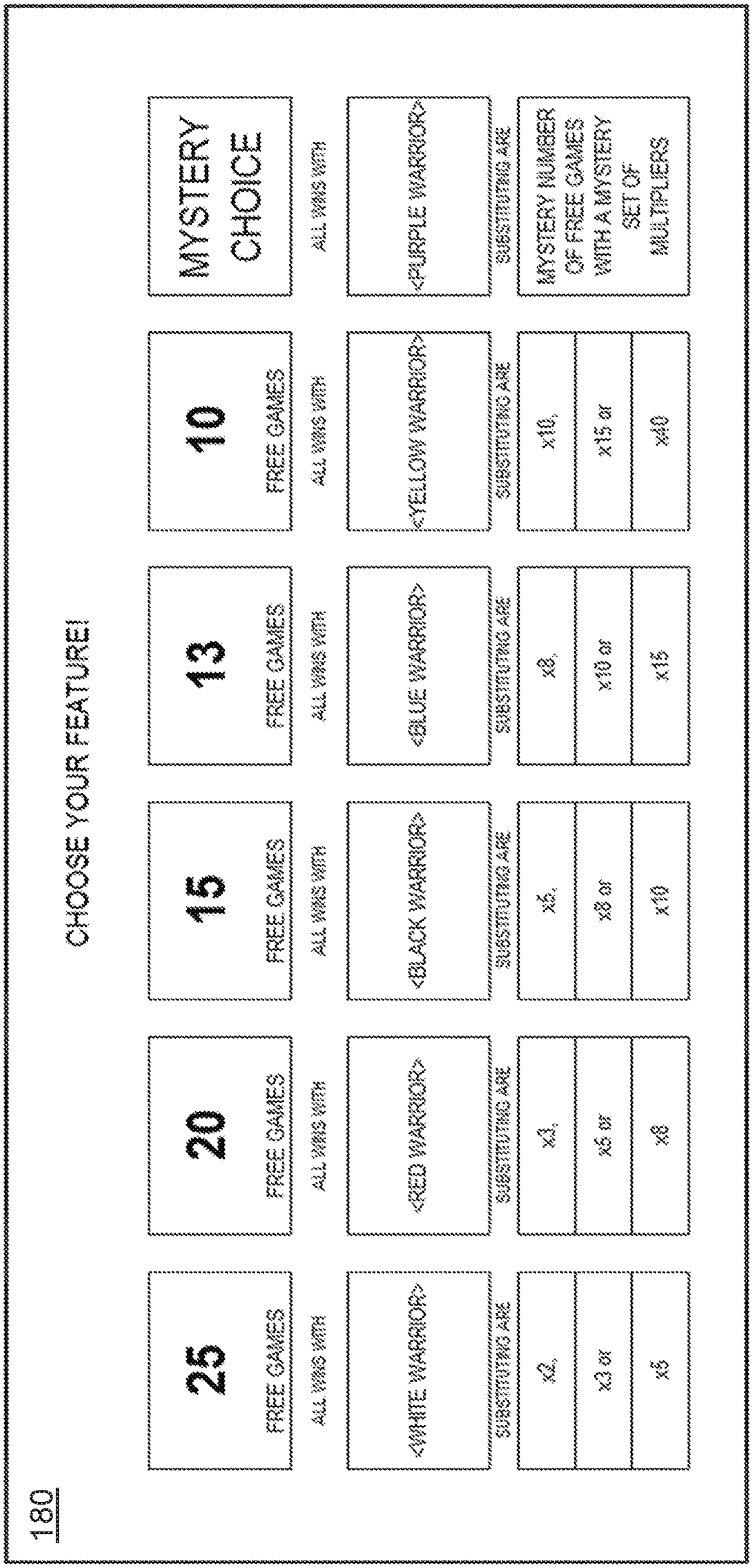
FIG. 8 is a schematic view of the display of the gaming machine of FIG. 1 displaying feature games available when an ante bet has been made.

FIGS. 7 and 8 are, respectively, schematic views 170, 180 of display 34, 82 when feature game controller 150 controls display controller 140 to display the feature games of Table 1 and the feature games of Table 2 for player selection. In both cases, the player uses touch screen and/or buttons 84 of player interface 80 to select the desired feature game.

Processor 22 includes a feature game selector 158 that receives player input indicative of a selection of one of the available feature games. It should be noted that feature game 6 in Table 2 is termed a "Mystery Game", because the number of game rounds and the multiplier set are selected, randomly, and displayed only once that feature game has been selected (if it is selected). (In another embodiment, the number of game rounds and the available multiplier set are selected, randomly, before feature game 6 is selected, but not displayed until that feature game has been selected.) The selection of the number of game rounds and the multiplier set are made by feature game controller 150, and drawn from feature game characteristic sets 154 and feature game prize multiplier sets 156.

Once the feature game selection has been received by feature game selector 158, if the player has made an ante bet when awarded a feature game and then selected feature game 6 (see Table 2), feature game selector 158 controls feature game controller 150 to select the number of game rounds and the multiplier set as described above. Next, or if any other feature game has been selected, feature game selector 158 controls game controller 14 to conduct game play of the selected feature game.

Processor 22 includes a prize multiplier subset selector 160, prize multiplier selector 162 and prize awarder 164, a prize modifier 166 and a game round modifier 168. If, during the game play of the selected feature game, an outcome is determined by outcome determiner 14, prize awarder 164 determines the prize to be awarded. However, if an outcome is determined by outcome determiner 14 in which a specific scatter symbols substitutes in a win (which constitutes a required trigger condition), prize awarder 164 determines the prize that would, without the scatter symbol substitution, be awarded, prize multiplier selector 162 randomly selects a prize multiplier from the respective feature game prize multiplier set 156, prize modifier 166 receives the prize from prize awarder and the selected prize multiplier from prize modifier selector 162 and multiplies the prize by the selected prize multiplier, then passes the result back to prize awarder 164.

In this example, for each feature game a different, respective DRAGON symbol is specified as the scatter symbol; this specification is stored in the feature game characteristic sets 154.

In addition, if the player made an ante bet when awarded a feature game, there is a chance that some of the lowest multipliers of the feature game prize multiplier set 156 corresponding to the selected feature game will be effectively removed, hence increasing the likely effect of prize multiplication described above. Also, extra game rounds may be awarded. Thus, if the player made an ante bet when awarded a feature game, prize multiplier subset selector 160 randomly selects a subset of the feature game prize multiplier set 156 pertaining to the selected feature game (of feature games nos. 1 to 6); this includes randomly selecting both the size n of the subset (where $1 \le n \le N$, and N is the number of values in the feature game prize multiplier set 156), then randomly selecting the elements of the subset from the feature game prize multiplier set 156 starting from the lowest value. In the case of feature game no. 6 (the "Mystery Choice"), the feature game prize multiplier set 156 comprises sets of multipliers, so the random selection of a subset of the feature game prize multiplier set 156 comprises the selection of one or more of these sets. In one embodiment, if prize multiplier subset selector 160 randomly determines that any of these sets should be eliminated, it eliminates the lowest of these sets (hence, in the embodiment illustrated by reference to Table 2, the set {2, 3, 5}); in other embodiments, one or more of the sets constituting feature game prize multiplier set 156 pertaining to the "Mystery Choice" may be eliminated.

The result in this embodiment is that all values of prize multiplier in the relevant feature game prize multiplier set 156 but omitted from the subset are smaller (or, in the case of the "Mystery Choice", are on average smaller) than all values in the selected subset, to the benefit of the player.

It should also be noted that the subset may include all values from the set, so in a sense may not be mathematically a true 'subset.' Nonetheless, the term 'subset' is used for simplicity.

Once prize multiplier subset selector 160 has formed the subset, game play, outcome determination, prize awarding and prize modification proceed as described above, except that prize modifier 166 randomly selects a prize multiplier from the subset rather than from the relevant feature game prize multiplier set 156.

Furthermore, if the player made an ante bet when awarded a feature game round modifier 168 randomly selects a bonus number of game rounds (from 1 to 15), and adds these—during the selected feature game—to the number of game rounds that the selected feature game normally involves, also to the benefit of the player. Game round modifier 168 controls display controller 140 to modify the displayed number of game rounds (see FIG. 8) of the selected feature game to reflect the addition of the bonus game rounds. The feature game then commences.

Thus, while feature game play with and without an ante bet are essentially identical, play when an ante bet has been made will entail more game rounds and the chance of an improved prize multiplier.

Figure 9:
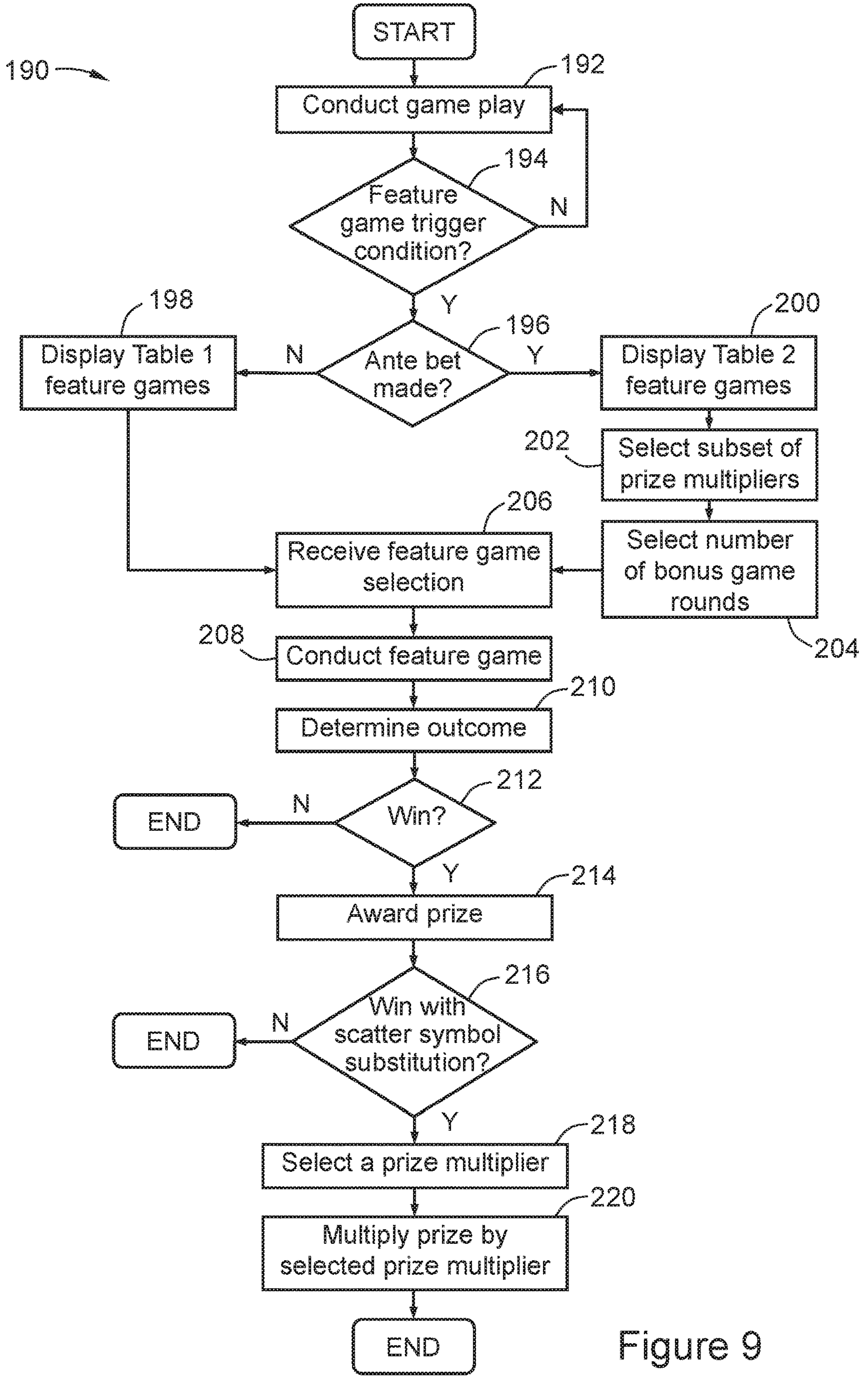
FIG. 9 is a flow diagram of the method implemented by the gaming machine of FIG. 1.

The method of this embodiment is summarized as a flow diagram 190 in FIG. 9. At step 192, games play is conducted. At step 194, feature game controller 150 determines whether the player has become eligible to be awarded a feature game (according to whether the relevant feature game trigger condition is met). If not, processing returns to step 192, but if the player has become eligible to be awarded a feature game, processing continues at step 196 where game controller 14 determines whether an ante bet has been made. If not, processing continues at 198 where display controller 140 displays the feature games of Table 1 for player selection. If an ante bet has been made, however, processing continues at step 200 where display controller 140 displays the feature games of Table 2 for player selection, at step 202 prize multiplier subset selector 160 selects the subset of prize multipliers and at step 204 the game round modifier 168 selects a bonus number of game rounds and applies them to the feature game.

In both cases (i.e. whether or not an ante bet was made), processing continues at step 206 where the player's feature game selection is received.

At step 208, game controller 14 conducts the selected feature game, at step 210 outcome determiner 144 determines an outcome of a game, after which at step 212 game controller 14 determines whether the outcome is a win or not; if not, processing ends but if the outcome is a win, processing continues at step 214 where prize awarder 164 awards a prize.

At step 216, game controller 14 determines whether the win was with scatter symbol substitution. If not, processing ends, but if so, processing continues at step 218 where prize multiplier selector 162 selects a prize multiplier (which will be from the subset selected at step 202 if an ante bet was made or from the set of prize multipliers for the selected feature game if not). At step 220, prize modifier 166 multiplies the awarded prize by the selected prize multiplier. Processing then ends.

It will be appreciated that other features known in electronic gaming machines and the games provided thereby can be advantageously and synergistically combined with the features described above.

Modifications and variations as would be apparent to a skilled addressee are deemed to be within the scope of the present invention.

In the claims that follow and in the preceding description of the invention, except where the context requires otherwise owing to express language or necessary implication, the word "comprise" or variations such as "comprises" or "comprising" is used in an inclusive sense, that is, to specify the presence of the stated features but not to preclude the presence or addition of further features in various embodiments of the invention.

Further, any reference herein to prior art is not intended to imply that such prior art forms or formed a part of the common general knowledge in other country.

What is claimed is:

1. A game controller for a gaming system, the game controller configured to execute instructions stored in a memory, which, when executed by the game controller, cause the game controller to at least:

receive an input to initiate a play of a game;

in response to a trigger event, display a plurality of selectable games from one of a first table of feature games and a second table of feature games, the displayed plurality of selectable games is the first table of feature games when the input is a first input, the displayed plurality of selectable games is the second table of feature games when the input is a second input, each of the first table and second table includes a plurality of games, each game of the plurality of games includes a corresponding set of prize modifiers capable of being applied to a prize awarded during the respective game of the plurality of games when a trigger condition is satisfied during the respective game;

receive a selection indicative of a selected game selected from the displayed plurality of selectable games; and conduct play of the selected game using the corresponding set of prize modifiers.

2. The game controller of claim 1, wherein the first input is an ante bet, wherein the second input declines an ante bet.

3. The game controller of claim 1, wherein the corresponding set of prize modifiers is used during play when a trigger condition is satisfied during the selected game.

4. The game controller of claim 1, wherein each game of the plurality of games further includes a corresponding number of free spins, wherein conducting play of the selected game further includes conducting the number of free spins corresponding to the selected game.

5. The game controller of claim 1, wherein the prize modifiers in the set of prize modifiers are prize multipliers, wherein conducting play of the selected game further includes applying the corresponding set of prize modifiers to any prize awarded according to the outcome of the selected game by multiplying the prize by a prize multiplier from the prize modifiers.

6. The game controller of claim 1, wherein receiving a selection includes one of randomly or pseudo-randomly selecting the prize modifier from the set of prize modifiers based on an output of a random number generator (RNG).

7. The game controller of claim 1, wherein the instructions further cause the game controller to select a subset of prize modifiers from the set of prize modifiers such that any of the prize modifiers of the set of prize modifiers not in the subset of prize modifiers are smaller than all of the prize modifiers of the subset of prize modifiers.

8. The game controller of claim 1, wherein each game of the plurality of games further includes a corresponding trigger condition, wherein the trigger condition is a winning game outcome with a scatter symbol substitution.

9. The game controller of claim 1, wherein a number of game rounds differs between at least two of the games of the plurality of games.

10. The game controller of claim 9, wherein the instructions further cause the game controller to alter a displayed number of game rounds in the selected game after receiving a player selection of the game.

11. The game controller of claim 1, wherein the instructions further cause the game controller to display to a player one or more characteristics of at least one game of the plurality of games after receiving the selection.

12. The game controller of claim 1, wherein the instructions further cause the game controller to display to a player one or more characteristics of at least one game of the plurality of games after receiving selection of the selected game and only if the player has made an ante bet.

13. The game controller of claim 12, wherein the instructions further cause the game controller to select the one or more characteristics of the at least one game randomly or pseudo-randomly from a set of possible values of the one or more characteristics.

14. The game controller of claim 1, wherein the instructions further cause the game controller to randomly or pseudo-randomly select and award a number of bonus game rounds when a trigger condition is satisfied.

15. The game controller of claim 14, wherein the instructions further cause the game controller to award eligibility to the feature game in response to a feature game trigger condition being satisfied in relation to a base game.

16. A gaming system comprising:

a player interface comprising a display for displaying game outcomes to a player; and a game controller configured to execute instructions stored in a memory, which, when executed by the game controller, cause the game controller to at least:

receive an input to initiate a play of a game;

in response to a trigger event, display a plurality of selectable games from one of a first table of feature games and a second table of feature games, the displayed plurality of selectable games is the first table of feature games when the input is a first input, the displayed plurality of selectable games is the second table of feature games when the input is a second input, each of the first table and second table includes a plurality of games, each game of the plurality of games includes a corresponding set of prize modifiers capable of being applied to a prize awarded during the respective game of the plurality of games when a trigger condition is satisfied during the respective game;

receive a selection indicative of a selected game selected from the displayed plurality of selectable games; and conduct play of the selected game using the corresponding set of prize modifiers.

17. The gaming system of claim 16, wherein the first input is an ante bet, wherein the second input declines an ante bet.

18. The gaming system of claim 16, wherein the corresponding set of prize modifiers is used during play when a trigger condition is satisfied during the selected game.

19. A method of electronic gaming implemented on an electronic gaming machine, the electronic gaming machine including at least one processor in communication with at least one memory device, a player input device, and a display device, the method comprising:

receiving an input to initiate a play of a game;

in response to a trigger event, displaying a plurality of selectable games from one of a first table of feature games and a second table of feature games, the displayed plurality of selectable games being the first table of feature games when the input is a first input, the displayed plurality of selectable games being the second table of feature games when the input is a second input, each of the first table and second table including a plurality of games, each game of the plurality of games including a corresponding set of prize modifiers capable of being applied to a prize awarded during the respective game of the plurality of games when a trigger condition is satisfied during the respective game;

receiving a selection indicative of a selected game selected from the displayed plurality of selectable games; and conducting play of the selected game on the gaming system using the corresponding set of prize modifiers.

20. The method of claim 19, wherein the first input is an ante bet, wherein the second input declines an ante bet, wherein the corresponding set of prize modifiers is used during play when a trigger condition is satisfied during the selected game.

* * * * *